(12) United States Patent
Weiss et al.

(10) Patent No.: US 10,821,396 B2
(45) Date of Patent: Nov. 3, 2020

(54) GAS REDIRECTING DEVICE FOR LIQUID-GAS CONTACTING COLUMN

(71) Applicants: TOTAL SA, Courbevoie (FR); IFP ENERGIES NOUVELLES, Rueil Malmaison (FR); PROSERNAT, Puteaux (FR)

(72) Inventors: Claire Weiss, Vaucresson (FR); Thomas Maubert, Paris (FR); Maxime Fournie, Paris (FR); Manel Fourati, Lyons (FR); Philippe Beard, Saint Genis Laval (FR); Pascal Alix, Roussillon (FR); Gauthier Perdu, Suresnes (FR); Clément Salais, Paris (FR); Vincent Carlier, Asnières sur Seine (FR)

(73) Assignees: TOTAL SA, Courbevoie (FR); IFP ENERGIES NOUVELLES, Rueil Malmaison (FR); PROSTERNAT, Puteaux (FR)

( * ) Notice: Subject to any disclaimer, the term of this patent is extended or adjusted under 35 U.S.C. 154(b) by 249 days.

(21) Appl. No.: 15/772,471

(22) PCT Filed: Oct. 30, 2015

(86) PCT No.: PCT/IB2015/002178
§ 371 (c)(1),
(2) Date: Apr. 30, 2018

(87) PCT Pub. No.: WO2017/072547
PCT Pub. Date: May 4, 2017

(65) Prior Publication Data
US 2018/0318752 A1 Nov. 8, 2018

(51) Int. Cl.
*B01D 53/18* (2006.01)
*B01D 3/20* (2006.01)
(Continued)

(52) U.S. Cl.
CPC ............ *B01D 53/18* (2013.01); *B01D 1/0005* (2013.01); *B01D 3/20* (2013.01); *B01D 3/24* (2013.01);
(Continued)

(58) Field of Classification Search
CPC . B01D 3/20; B01D 3/24; B01D 3/324; B01D 53/18; B01D 53/185;
(Continued)

(56) References Cited

U.S. PATENT DOCUMENTS 4,171,333 A * 10/1979 Moore ................... B01J 19/305
                                                    261/113
4,427,605 A * 1/1984 Meier ...................... B01D 3/20
                                                    202/158

(Continued)

FOREIGN PATENT DOCUMENTS

EP          2 438 981 A1    4/2012
WO    WO 2013/045770 A1    4/2013

OTHER PUBLICATIONS

International Search Report and Written Opinion for PCT/IB2015/002178, dated Jul. 18, 2016, 12 pages.

*Primary Examiner* — Charles S Bushey
(74) *Attorney, Agent, or Firm* — Patterson Thuente Pedersen, P.A.

(57) ABSTRACT

The present invention relates to a gas-redirecting device presenting an upper plane and a plurality of gas-redirecting tubes comprising an inlet end and an outlet end. For each gas-redirecting tube, the orthogonal projections of the inlet end and the outlet end onto the upper plane have an over-lapping area of at most 50% of the total area of the upper plane covered by the orthogonal projections. Also provided is a liquid-gas contacting column comprising a gas-redirecting device, a floating support comprising a liquid-gas contacting column, at least two packed beds and a (Continued)

method for improving the efficiency of a liquid-gas contacting column which is based on redirecting the gas from a wetted zone of a lower packed bed to a wetted zone of the higher packed bed.

10 Claims, 6 Drawing Sheets

(51) Int. Cl.
  *B01D 53/14* (2006.01)
  *B01D 1/00* (2006.01)
  *B01D 3/24* (2006.01)
  *B01D 3/32* (2006.01)
(52) U.S. Cl.
  CPC ......... *B01D 3/324* (2013.01); *B01D 53/1406* (2013.01); *B01D 53/1462* (2013.01); *B01D 2259/4566* (2013.01); *B01J 2208/00849* (2013.01)
(58) Field of Classification Search
  CPC ............ B01D 53/1462; B01D 53/1406; B01D 1/0005; B01D 2259/4566; B01J 2208/00849
  USPC ...................................... 261/95, 96
  See application file for complete search history.

(56) References Cited

U.S. PATENT DOCUMENTS

| | | | | |
|---|---|---|---|---|
| 4,747,970 A * | 5/1988 | McFarland | ........... | C01B 17/806 261/96 |
| 4,820,455 A * | 4/1989 | Kunesh | ..................... | B01D 3/18 261/113 |
| 5,407,647 A * | 4/1995 | Tarancon | ................ | B01D 53/74 422/140 |
| 7,234,692 B2 * | 6/2007 | Dichtl | .................... | B01D 3/008 261/114.2 |
| 7,901,641 B2 * | 3/2011 | Kumar | ..................... | B01J 8/025 422/220 |
| 9,399,229 B2 * | 7/2016 | Nascimento | ........... | B01D 3/008 |
| 2008/0271983 A1 * | 11/2008 | Alzner | .................. | B01D 3/008 202/158 |
| 2013/0277868 A1 * | 10/2013 | Haroun | ................... | B63B 35/44 261/113 |
| 2013/0277869 A1 * | 10/2013 | Haroun | ............... | B01F 3/04496 261/114.5 |
| 2014/0231309 A1 * | 8/2014 | Bazer-Bachi | ........ | C10G 49/002 208/142 |
| 2016/0082364 A1 * | 3/2016 | Haroun | ............... | B01F 3/04078 261/113 |

* cited by examiner

GAS REDIRECTING DEVICE FOR LIQUID-GAS CONTACTING COLUMN

RELATED APPLICATIONS

The present application is a National Phase entry of PCT Application No. PCT/IB2015/002178, filed Oct. 30, 2015, said application being hereby incorporated by reference herein in its entirety.

FIELD OF THE INVENTION

The present invention relates to the improvement of gas processing efficiency in an oscillating liquid-gas contacting column placed on a floating support.

BACKGROUND OF THE INVENTION

Raw natural gas, coming primarily from crude oil wells, gas wells and condensate wells, comprises varying amounts of contaminants such as acid gases (carbon dioxide ($CO_2$), hydrogen sulfide ($H_2S$), and mercaptans such as methanthiol), water and mercury. To be marketed, raw natural gas must be purified in natural-gas-processing plants to meet the quality standards specified by the distribution companies or the LNG specifications. A natural-gas processing plant comprises different process units to remove impurities such as several liquid-gas contacting columns that removes acid gas and water, and adsorption units to remove different types of contaminants, for example mercury. These liquid-gas contacting columns operate under counter-current or co-current liquid-gas flow conditions.

A conventional packed liquid-gas contacting column operating under counter-current liquid-gas flow conditions is a cylindrical column equipped with a gas outlet at the top, a liquid outlet at the bottom, a gas inlet and a liquid inlet positioned either respectively at the bottom and top or both at the vicinity of the middle of the column, a plurality of packed beds and a column internal between two packed beds. In operation, a liquid stream is circulated downwards and the gas to be treated is circulated upwards. Liquid and gas are contacted in the packed beds. For example, raw natural gas is contacted with an aqueous amine solution to remove acid gases from the natural gas. The treated natural gas is recovered at the top of the column, while the acidified aqueous amine solution is recovered at the bottom of the column. The column internal collects the liquid to redistribute the collected liquid from one higher packed bed to a lower packed bed while allowing gas to pass through.

The natural-gas processing plant may further comprise a liquefaction unit for liquefying the treated natural gas for ease of storage or transport. Until now, liquefied natural gas has been produced in onshore natural-gas processing plants built, thereby comprising onshore liquid-gas contacting column. But offshore technologies have been developed since the mid-1990's to treat and liquefy raw natural gas on a floating support. For example, offshore columns can be installed on vessels, floating barges or offshore platforms, of FPSO (Floating Production, Storage and Offloading) type or of FLNG (Floating Liquefied Natural Gas) type for example. Floating barges may also comprise distillation columns or dehydration columns.

FLNG technology provides a number of environmental advantages such as reducing the environmental footprint of the project and preserving marine and coastal environments, since the whole processing is done at the gas-extraction site, i.e. there is no need to build pipelines and to use compression units to pump the gas from the off-shore gas field and bring it on shore, or to build an oil platform or an onshore natural-gas processing plant. FLNG technology also provides a number of economic advantages, for example, pumping gas to the shore can be prohibitively expensive due to the construction of pipelines.

However, the current FLNG technology challenge is that each element of the natural-gas processing plant and liquefaction unit needs to fit into a floating support having limited space, while maintaining appropriate levels of safety and achieving the desired specification.

To rise to the above challenge, it is necessary to consider the impact of motion due to waves and weather on the floating support first to secure the floating support and then optimize the design of the process units, in particular the liquid-gas contacting columns.

The floating support motion can cause the liquid-gas contacting column to move away from the vertical orientation, which is generally the orientation considered during design of the units. The motion of the liquid-gas contacting column, and thus the resulting angular acceleration of the liquid-gas contacting column, has a significant impact on liquid distribution within the packing beds, leading to the appearance of wetted zones differentiated by the liquid load therethrough. This phenomenon is known as the liquid maldistribution, i.e. some wetted zones receive more liquid than others so that in overall, different gas portions are treated unevenly. Wetted zones can be sorted into underloaded areas or overloaded areas according to the liquid load therethrough. In an underloaded area, the gas is not effectively treated, while in an overloaded area, the gas is over-treated. It results in an inhomogeneity of the gas treatment and a global loss of efficiency of the liquid-gas contacting column. This may significantly impact the column design basis (increased diameter and height of the column are needed to compensate the loss of efficiency) and consequently the whole FLNG project.

Industrial feedback on floating support is limited and does not allow precise predictions on this global loss of gas treatment efficiency of the liquid-gas contacting column. Extrapolations from past experience on floating support to liquid-gas contacting column are mainly based on dehydration applications or separation columns (Cullinane, Yeh, Grave, 2011 "Effect of Tower Motion on Packing Efficiency", SPE 143766, Brasil Offshore Conference, Macaé, Brazil). Literature (Kobayashi et al., "An experimental study on the behaviour of the two types of absorption towers installed in the float type LNG facilities", AIChE National Meeting, 118C, 1999; Yoshinaga et al., "Effects of barge motion on absorption column", $90^{th}$ AICHE national meeting, Houston, 5-9 April, Prepr. N26D 25P, 1981; Berger et al., "LNG production on marine structures with clarification of motion influence on absoprtion and rectification", Seventh International Conference on Liquefied Natural Gas, Vol 1&2, Sessions I et II, 1983; Tanner et al. "Modelling the performance of a packed column subjected to tilt", Tran IChemE, vol 74, Part A, 177-182, 1996) indicates that the performance of packed beds could be decreased by up to 60%. This global loss of efficiency depends highly on the system (separation, absorption), the gas/liquid contactor (packing, tray) and the overall geometry and location of the column on board the floating support.

Due to the global loss of efficiency of the gas treatment, it was contemplated to increase the column capacity, e.g. by increasing the size of the column. However, this would increase constraints exerting onto the structure of the floating support itself. This means that the size of the floating support would be so large, that economic feasibility of the project can be jeopardized.

Different devices have been contemplated to compensate for the loss of efficiency due to liquid maldistribution in a liquid-gas contacting column such as those described in U.S. Pat. No. 4,820,455, WO 2014/070352 and WO 2015/090476. These devices are disposed between two packed beds or within one packed bed in the liquid-gas contacting column. They are all based on the principle of first mixing the gas to homogenize said gas and then evenly redistributing the mixed gas inside the liquid-gas contacting column.

SUMMARY OF THE INVENTION

The present invention provides a gas-redirecting device that can redirect the gas from a first wetted zone to a second wetted zone, the first wetted zone and the second wetted zone being offset from one to another with respect to a vertical line.

One aspect of the invention is a gas-redirecting device for a liquid-gas contacting column, the gas-redirecting device comprising:
  a plate presenting an upper plane and having a plurality of through-holes allowing gas to pass through the plate;
  a plurality of gas-redirecting tubes, each gas-redirecting tube comprising an inlet end and an outlet end and being fluidly connected to a through-hole of the plate and;
characterized in that for each gas-redirecting tube, the orthogonal projections of the inlet end and the outlet end onto the upper plane have an overlapping area of at most 50% of the total area covered by the projections of the inlet end and outlet end.

Thanks to the gas-redirecting device of the present invention, in operation, portions of gas flowing upwards can be redirected from a wetted zone of the first packed bed to a wetted zone of the second packed bed of the liquid-gas contacting column, the wetted zone of the first packed bed and the wetted zone of the second packed bed being offset from one another with respect to a vertical line, i.e. if a vertical line is drawn from the wetted zone of the first packed bed, this vertical line will not go through the wetted zone of the second packed bed. The gas flowing upwards is thus neither aimed to be mixed nor homogenized between the packed beds. It has been discovered that this results in a more homogenized treatment of all portions of the gas flowing upwards.

Preferably, the orthogonal projections of the inlet end and outlet end onto the upper plane have an overlapping area of 0% of the total area covered by the projections of the inlet end and outlet end; in other words they do not overlap.

Additionally or alternatively, the outlet end of each of the plurality of gas-redirecting tubes is adapted to let a gas flow in a direction substantially orthogonal to the upper plane. In another embodiment, the outlet end of each of the plurality of gas-redirecting tubes is adapted to let a gas flow in a direction substantially parallel to the upper plane.

Additionally or alternatively, each gas-redirecting tube is fixed to the plate, preferably each gas-redirecting tube is welded, gasketed, bolted, screwed, clamped or press fitted to the plate.

Additionally or alternatively, the gas-redirecting device further presents an orifice allowing liquid to pass through the plate, preferably the orifice is provided in the plate. There may be a plurality of orifices allowing liquid to pass through the plate. The plurality of orifices may be homogeneously distributed throughout the gas-redirecting device to distribute the liquid homogeneously.

Additionally or alternatively, the gas-redirecting device further comprises at least one liquid-collecting tube comprising an inlet end and an outlet end and being fluidly connected to one orifice by its inlet end.

Another aspect of the invention is a liquid-gas contacting column comprising:
  at least two packed beds;
  a gas-redirecting device as described above positioned between two packed beds.

In one embodiment, the liquid-gas contacting column may further comprise a closed side wall presenting an inner surface, and the gas-redirecting device may be tightly fixed to the inner surface.

Additionally or alternatively, the wall is cylindrical and has a longitudinal axis and the upper plane of the plate is orthogonal to said longitudinal axis Additionally or alternatively, the liquid-gas contacting column is an absorption column, a separation column or a heat exchange column.

Another aspect of the invention is a floating support comprising the liquid-gas contacting column described above.

Another aspect of the invention is a method for improving the efficiency of a liquid-gas contacting column having at least a first packed bed and a second packed bed positioned higher than the first packed bed, each having wetted zones differentiated by the liquid load therethrough, comprising the following step:
  redirecting the gas from a wetted zone of the first packed bed to a wetted zone of the second packed bed,
  characterized in that the wetted zone of the first packed bed and the wetted zone of the second packed bed are offset from one another with respect to a vertical line.

The wetted zone of the first packed bed may be an underloaded area and the wetted zone of the second packed bed an overloaded area or a normally loaded area.

Additionally or alternatively, the wetted zone of the first packed bed is an overloaded area and the wetted zone of the second packed bed is an underloaded area or a normally loaded area.

Additionally or alternatively, the wetted zone of the first packed bed is a normally loaded area and the wetted zone of the second packed bed is an underloaded area or an overloaded area.

Additionally or alternatively, the differentiated wetted zones are sorted into a plurality of types of wetted zone according to the liquid load flowing therethrough, and wherein the gas is redirected so that when it flows from the bottom gas inlet to the top gas outlet of the liquid-gas contacting column, it passes through at least two types of wetted zone, preferably through three types of wetted zones, more preferably through each type of wetted zones.

BRIEF DESCRIPTION OF THE DRAWINGS

Further objectives, features and advantages of the present invention will become apparent upon reading the following description with reference to the illustrative and non-limiting drawings, amongst which.

DETAILED DESCRIPTION OF THE INVENTION

The present invention is more precisely described below with reference to a gas flowing upwards from a first packed bed to a second packed bed positioned higher than the first packed bed in a liquid-gas contacting column, while a liquid streams downwards from the second packed bed to the first packed bed. The first packed bed can also be described as a lower packed bed and the second packed bed as a higher packed bed. However, the present invention is not limited to the following described embodiments and it will be obvious to the person skilled in the art that various changes and modifications can be made without departing from the scope of the invention.

Further, in the present disclosure, the words "up", "upper", "higher", "top", "lower", and "bottom" are used to describe components of the devices according to the invention and as such are to be considered with reference to the devices in their operating position.

Figure 8:
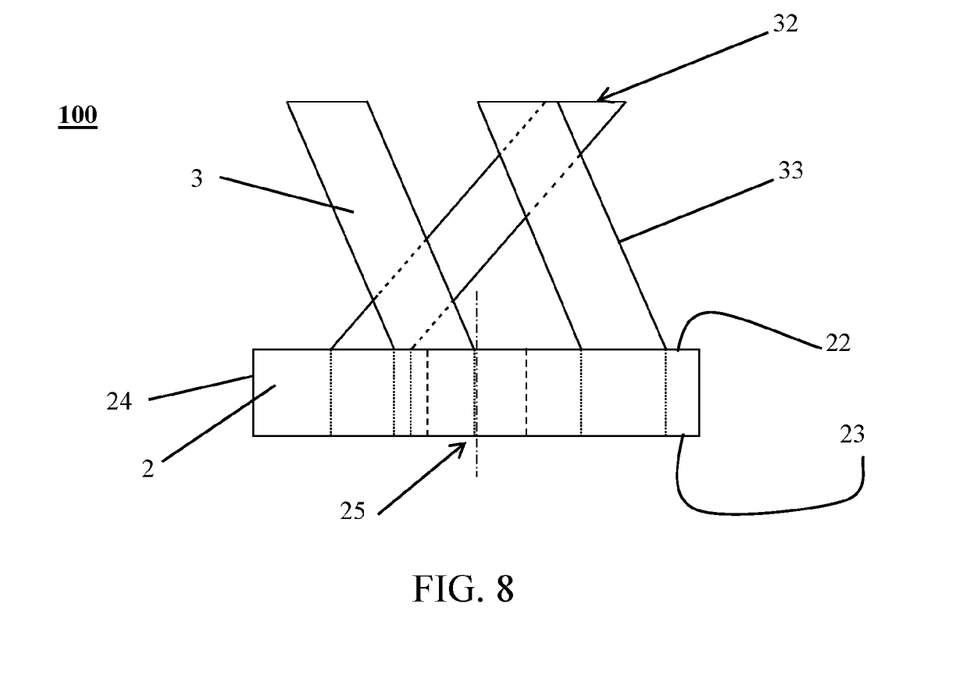
FIG. 8 is a schematic side view of the gas-redirecting device of FIG. 7.
Figure 9:
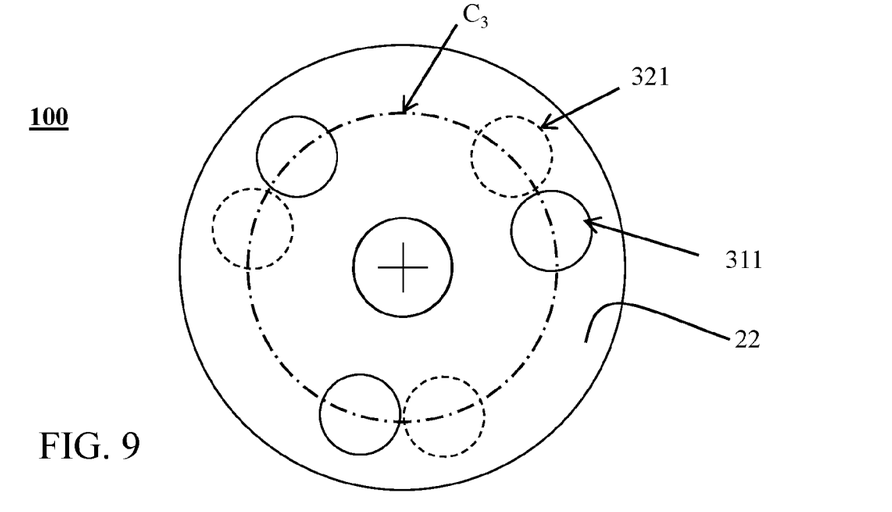
FIG. 9 is a schematic top view of the upper plane of the gas-redirecting device of FIG. 7 showing the orthogonal projections of the inlet ends and outlet ends of the gas-redirecting tubes.
Figure 10:
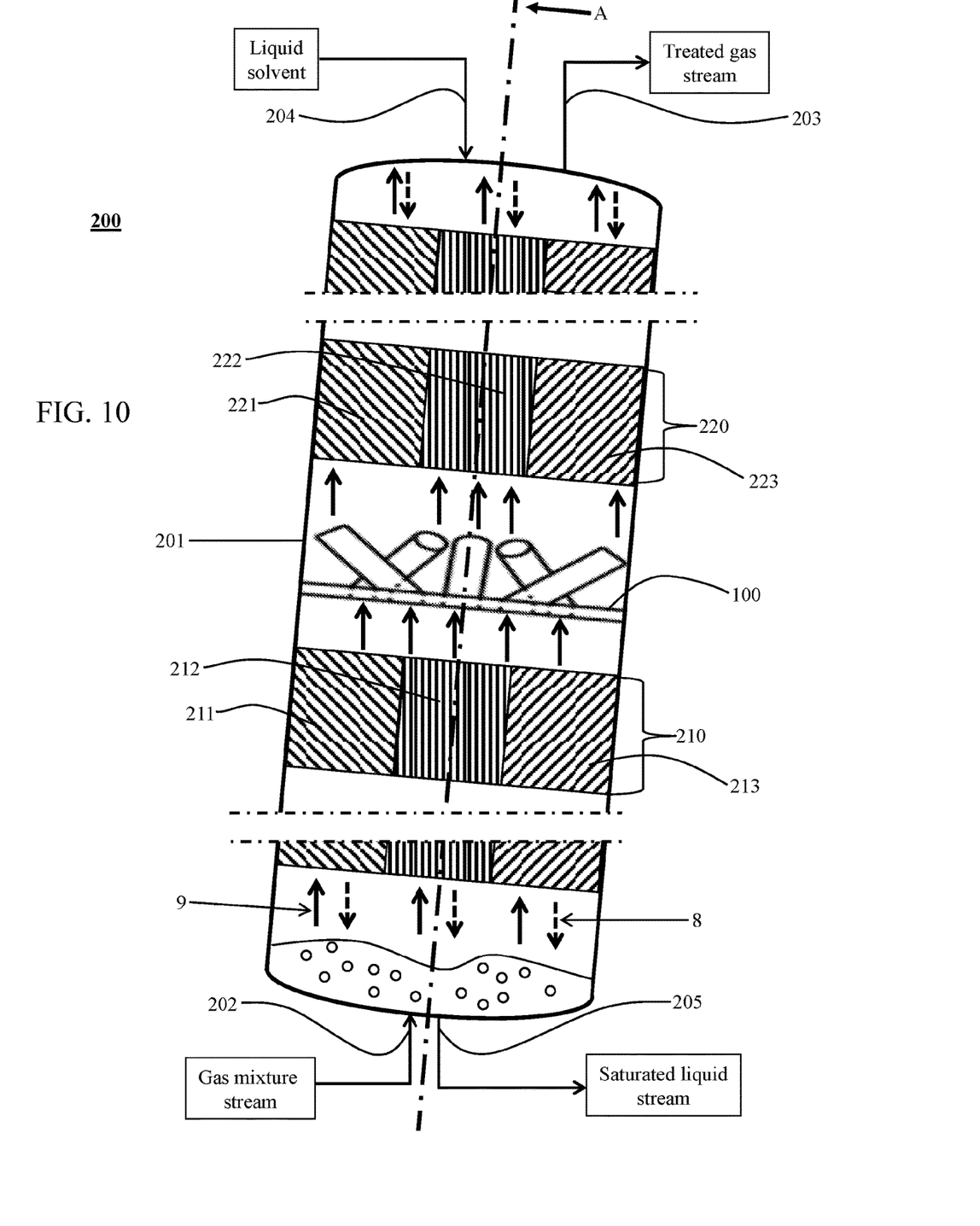
FIG. 10 is a schematic inner representation of a liquid-gas contacting column operating under counter-current liquid-gas flow conditions comprising a gas-redirecting device according to the present invention.

A gas-redirecting device for a liquid-gas-contacting column is described hereafter with reference to FIGS. 1 to 9 after a description of a liquid-gas contacting column with reference to FIG. 10.

FIG. 10 schematically illustrates a liquid-gas contacting column 200 comprising the gas-redirecting device 100 for a liquid-gas-contacting column 200 of the present invention. Such a liquid-gas contacting column 200 further comprises at least a first packed bed 210 and a second packed bed 220 and typically presents a longitudinal axis A and comprises a closed side wall 201 with an inner surface that defines an inner space, a gas outlet 203 at the top of the side wall 201, a liquid outlet 205 at the bottom of the side wall 201.

In operation, a gas 9 flows upwards from the first packed bed 210 to the second packed bed 220, while a liquid 8 streams downwards from the second packed bed 220 to the first packed bed 210. The first and second packed beds 210, 220 are comprised within the inner space of the liquid-gas contacting column 200, the second packed bed 220 being positioned higher than the first packed bed 210.

Each packed bed may be a hollow tube, pipe, or other type of vessel. It is a device filled with a packing material. The packing material may consist of small objects, such as Raschig rings, randomly filling the packed bed. The packing material may also be a specifically structured packing typically consisting of corrugated metal plates. In all cases, the packing material improves the contact between the liquid and the gas over a large contact area.

The closed side wall 201 may present a cylinder shape, preferably a right circular cylinder. The closed wall may alternatively comprise at least one frustoconical portion and at least two cylindrical portions connected to each other by the frustoconical portion so that the section of the liquid-gas contacting column varies along its length.

The liquid-gas contacting column 200 may operate under counter-current liquid-gas flow conditions. For example, the liquid-gas contacting column 200 may be an absorption column, a separation column or a heat exchange column.

The liquid-gas contacting column 200 may also be a floating offshore liquid-gas contacting column or an onshore liquid-gas contacting column.

An absorption column further comprises a liquid inlet 204 at the top of the closed side wall 201 through which a liquid is injected into the absorption column forming a liquid stream, and a gas inlet 202 at the bottom of the closed side wall 201 through which a gas is provided as a gas mixture. The gas mixture is intended to be treated by the liquid. As such, the liquid is a solvent intended to absorb preferentially one or more gaseous components of the gas mixture flowing from the bottom to the top of the absorption column which are wished to be removed from the gas mixture.

In the first and second packed beds 210, 220, the gas mixture 9 flowing upwards and the liquid stream 8 falling downwards are contacted so that the one or more gaseous components are preferentially absorbed. A treated gas stream, having a lower concentration of the one or more gaseous components, is recovered at the top of the absorption column through the gas outlet 203. A saturated liquid stream, having a higher concentration of the one or more gaseous components, is recovered at the bottom of the absorption column through the liquid outlet 205.

The absorption column may be an acid gas absorption column wherein the acid gas is for example carbon dioxide ($CO_2$) or hydrogen sulfide ($H_2S$), and the liquid solvent is for example an amine or a mixture of amines.

The absorption column may also be a dehydration column wherein glycols (for example triethylene glycol, diethylene glycol, ethylene glycol, and tetraethylene glycol or mixtures thereof) form a liquid desiccant system that removes gaseous water from gas mixture, such as natural gas.

A separation column further comprises an inlet for feeding the separation column with a feed stream comprising a mixture of chemical components (not represented in the figures). The inlet is more typically placed at mid-height, although it may be placed anywhere else in the vicinity of the mid-height. In the packed beds, the chemical components are physically separated into a gas portion and a liquid portion. The separation is based on differences in the chemical components' boiling points and vapor pressures at specified operation temperatures and operation pressures. Condensation and vaporization of the chemical compounds occur in each packed bed, causing lower boiling point components to rise to the top of the separation column and higher boiling point components to fall to the bottom. A gas is recovered at the top of the separation column through the gas outlet, while a liquid is recovered at the bottom of the column through the liquid outlet.

A heat exchange column further comprises a liquid inlet 204 at the top of the closed side wall 201 through which a liquid is injected into the heat exchange column forming a liquid stream, and a gas inlet 202 at the bottom of the closed side wall 201 through which a gas is provided as a gas stream. The gas stream and the liquid stream are intended to exchange heat. Depending on heat capacity of the gas stream and the liquid stream:

- a hotter gas is recovered at the top of the heat exchange column through the gas outlet, while a colder liquid is recovered at the bottom of the column through the liquid outlet, or
- a colder gas is recovered at the top of the heat exchange column through the gas outlet, while a hotter liquid is recovered at the bottom of the column through the liquid outlet.

The liquid-gas contacting column 200 may be provided on a floating support, such as an ocean vessel or on barges designed for lakes, bayous, and smaller bodies of water. Because the support is a floating support, it is subjected to movement of the water body, which may cause the liquid-gas contacting column to be moved, in particular to be tilted, i.e. its longitudinal axis is no longer vertical.

The verb "to move" as used herein, is intended to refer to an oscillation movement according to one of the six degrees of freedom (yaw, pitch, roll, heave, sway, thrust) and any of their combination.

As mentioned above, a problem in the operation of an oscillating liquid-gas contacting column 200 is the liquid maldistribution in the first packed bed 210 and the second packed bed 220 resulting in the formation of wetted zones 211, 212, 213; 221, 222, 223 in said packed beds 210, 220, each wetted zone 211, 212, 213; 221, 222, 223 having a specific liquid load, thereby resulting in an inhomogeneity of the gas treatment and a global loss of efficiency of the liquid-gas contacting column 200.

In order to overcome this drawback, the gas-redirecting device 100 of the present invention comprises a plate 2.

Plate

The plate 2 of the gas-redirecting device 100 presents an upper plane P and a plurality of through-holes 21.

The word "upper plane" as used herein, is intended to designate the upper surface of an enveloping right cylinder that is the smallest right cylinder entirely enveloping the plate. Once the gas-redirecting device is in its operative position, the upper plane is generally orthogonal to the longitudinal axis of the liquid-gas contacting column.

The plurality of through-holes 21 are intended to enable gas to pass through the plate 2. They are preferably homogeneously distributed throughout the plate 2. The edge of the through-holes 21 may have a parallelepipedic, circular, egg-shaped, oblong or oval shape.

The plate may present an upper surface 22, a lower surface 23 and a lateral wall 24.

The upper surface 22 of the plate 2 is intended to receive and collect the liquid. The upper surface 22 may be flat, concave, convex, or corrugated.

Figure 1:
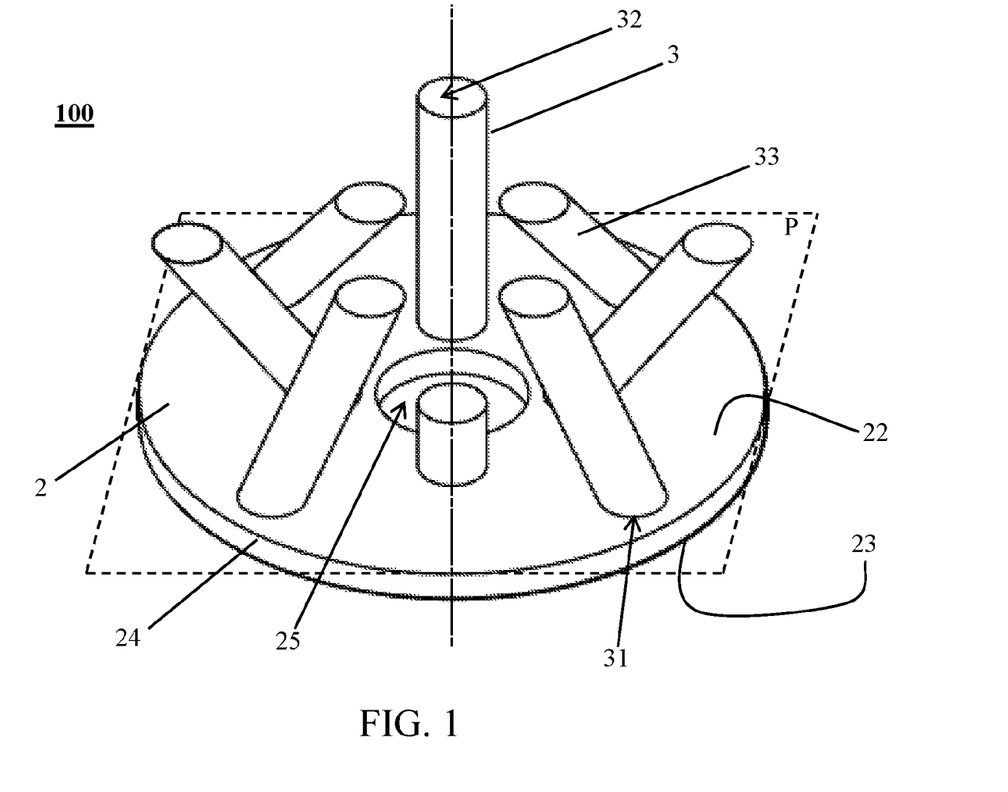
FIG. 1 is an axonometric projection schematically illustrating a gas-redirecting device according to the present invention having eight gas-redirecting tubes.
Figure 2:
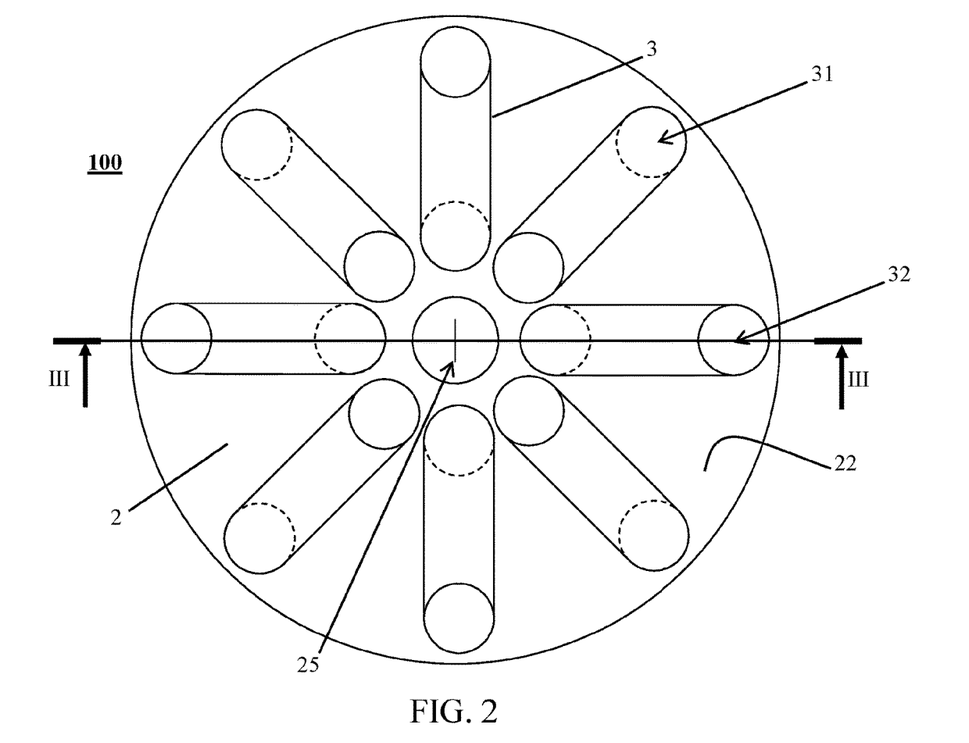
FIG. 2 is a schematic top view of the gas-redirecting device of FIG. 1.
Figure 3:
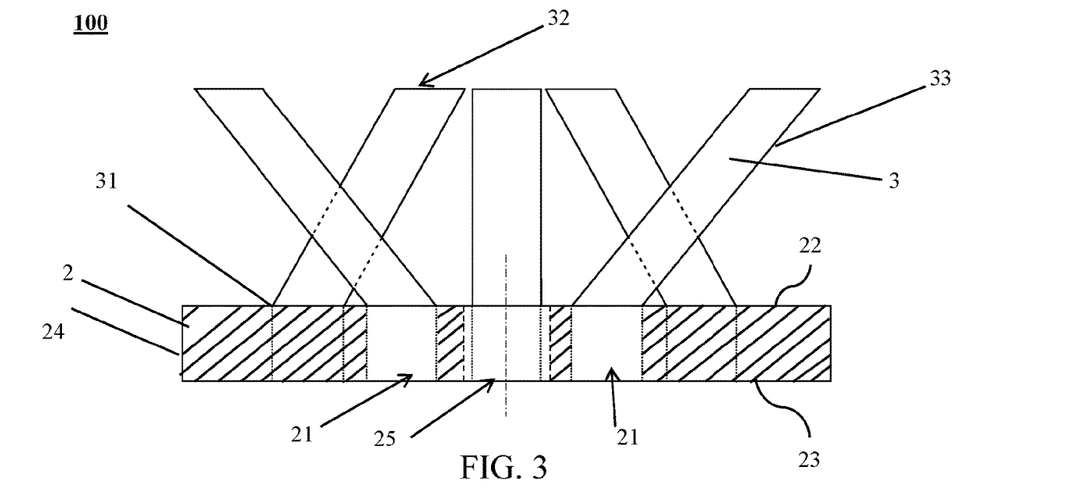
FIG. 3 is a schematic section view along direction of the gas-redirecting device of FIG. 2.
Figure 4:
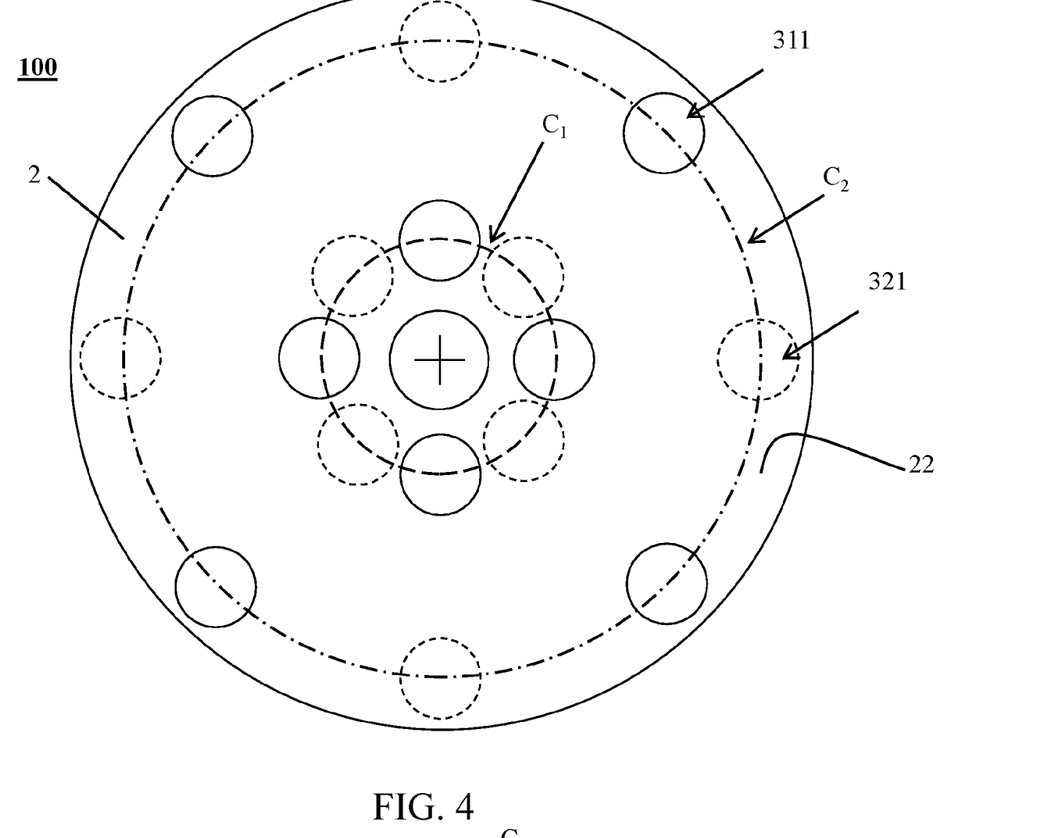
FIG. 4 is a schematic top view of the upper plane of the gas-redirecting device of FIG. 2 showing the orthogonal projections of the inlet ends and outlet ends of the gas-redirecting tubes.
Figure 5:
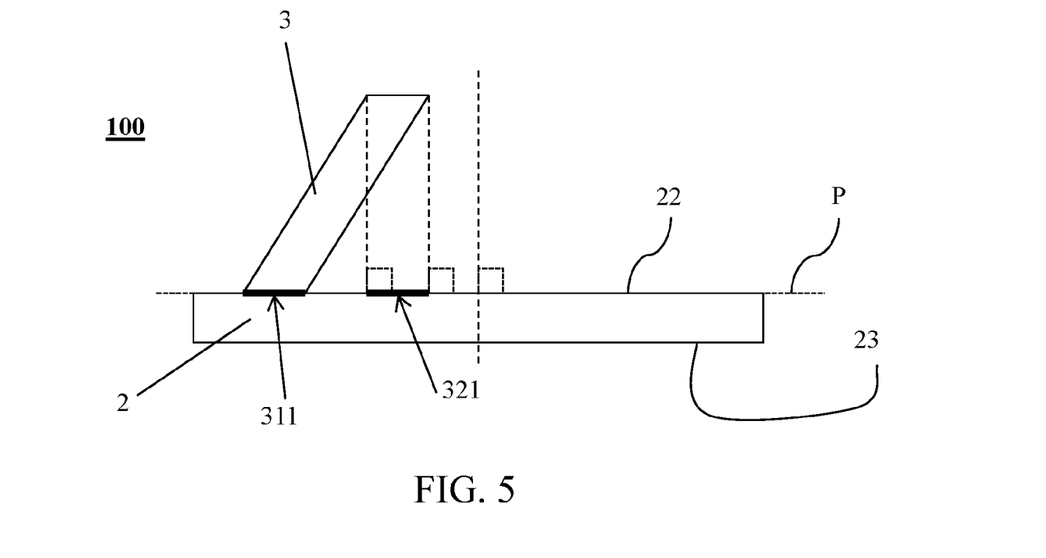
FIG. 5 is a schematic representation of the upper plane and the orthogonal projections of the inlet end and the outlet end of one gas-redirecting tube for a gas-redirecting device according to the present invention having a flat upper surface.
Figure 6:
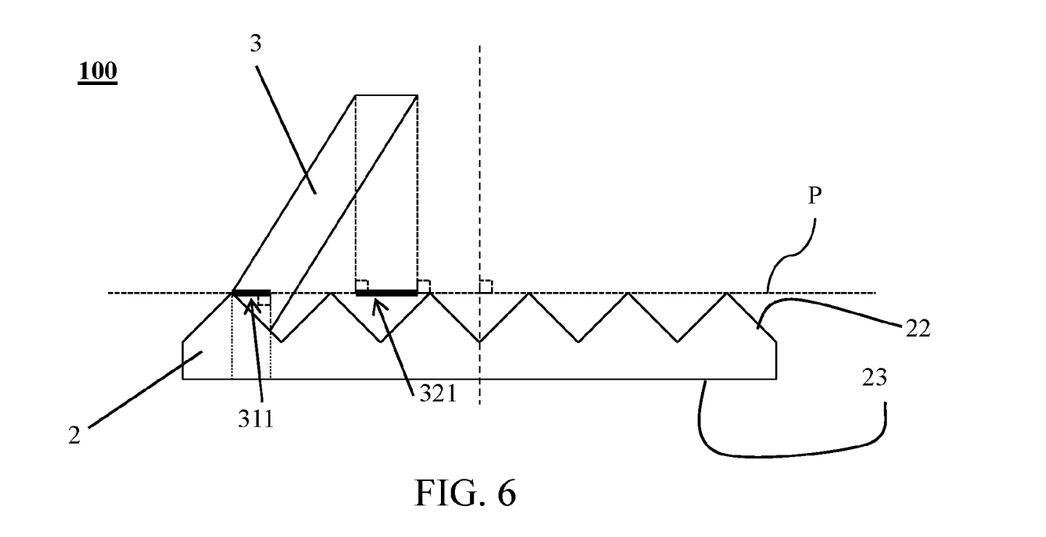
FIG. 6 is schematic representation of the upper plane and the orthogonal projections of the inlet end and the outlet end of one gas-redirecting tube for a gas-redirecting device according to the present invention having a corrugated upper surface.

As illustrated on the FIG. 5, in case the upper surface 22 of the plate 2 is flat, the upper plane P is the flat upper surface 22 of the plate 2. In case the upper surface 22 of the plate 2 is concave, the upper plane P is a plane tangent to the peripheral edges of the plate 2. In case the upper surface of 22 the plate 2 is convex, or respectively corrugated (as illustrated in FIG. 6), the upper plane P is a plane tangent to the apex of the convex upper surface 22, or respectively the apexes of the corrugated upper surface 22.

If the upper surface 22 is concave the liquid is collected at its lowest portion, preferably its lowest portion is at its center. If the upper surface 22 is convex the liquid is collected at its peripheral edges. If the upper surface 22 is corrugated the liquid 230 is collected at the bottom of the waves or folds.

The lower surface 23 of the plate 2 is intended to direct gas up to the through-holes 21. The lower surface 23 may be corrugated or comprise a plurality of concave portions. If the lower surface 23 is corrugated, the through-holes 21 are positioned at the top of the waves or folds. If the lower surface 23 comprises a plurality of concave portions, the through-holes are positioned at the highest portion of each concave portion.

Liquid-Collecting Tube

The plate 2 may further comprise at least one orifice 25 allowing liquid to pass therethrough. The at least one orifice 25 is located at the point where liquid is collected. For example, if the upper surface 22 is concave, the at least one orifice 25 may be located at the lowest portion of the upper surface, preferably its lowest portion is at its center. If the upper surface 22 is convex the at least one orifice 25 may be located at its peripheral edges. If the upper surface 22 is corrugated, the at least one orifice 25 may be located at the bottom of the waves or folds.

If the plate 2 comprises the at least one orifice 25, the gas-redirecting device 100 may further comprise at least one cylindrical liquid-collecting tube comprising a liquid inlet end and a liquid outlet end and a peripheral wall between the liquid inlet end and the liquid outlet end. The cylindrical liquid-collecting tube is fluidly connected to the at least one orifice 25 so that liquid can flow through the orifice 25, enter through the liquid inlet end into the cylindrical liquid-collecting tube and exit the cylindrical liquid-collecting tube through the liquid outlet end. If the cylindrical liquid-collecting tube is fluidly connected to only one orifice 25, the dimension of its peripheral wall may fit tightly within the orifice 25 or the peripheral wall at the liquid inlet end is fixed to the lower surface 23 of the plate, thereby surrounding the orifice 25. If the cylindrical liquid-collecting tube is fluidly connected to a plurality of orifices 25, the peripheral wall at the liquid inlet end is fixed to the lower surface 23 of the plate, thereby surrounding the plurality of orifices 25.

The liquid-collecting tube may be further fluidly connected, by its liquid outlet end, to a liquid distributor known by the skilled person, such as a Sparger-typed liquid distributor.

Gas Redirecting Tubes

The gas-redirecting device 100 further comprises a plurality of gas-redirecting tubes 3. Each gas-redirecting tube 3 comprises an inlet end 31, an outlet end 32 and a peripheral wall 33 between the inlet end 31 and the outlet end 32.

Each gas-redirecting tube 3 is fluidly connected to at least one through-hole 21 of the plate 2 so that gas can flow through the through-hole 21, enter through the inlet end 31 into the gas-redirecting tube 3 and exit the gas-redirecting tube 3 through the outlet end 32. If each gas-redirecting tube 3 is fluidly connected to only one corresponding through-hole 21, the dimension of its peripheral wall 33 may tightly fit within the corresponding through-hole 21 or the peripheral wall 33 at the inlet end 31 is tightly fixed to the upper surface 22 of the plate 2, thereby surrounding the corresponding through-hole 21. If each gas-redirecting tube 3 is fluidly connected to a corresponding plurality of through-holes 21, the peripheral wall 33 at the inlet end 31 is tightly fixed to the upper surface 22 of the plate 2, thereby surrounding the corresponding plurality of through-holes 21.

Further, as illustrated in FIGS. 4 to 6 and 9, for each gas-redirecting tube 3, the orthogonal projection 311 of the inlet end 31 onto the upper plane and the orthogonal projection 321 of the outlet end 32 onto the upper plane have an overlapping area of at most 50% of the total area of the upper plane covered by the orthogonal projections 311, 321 of the inlet end and the outlet end. In most cases, the orthogonal projection 311 of the inlet end 31 and the orthogonal projection 321 of the outlet end 32 present substantially the same area, thus, there are necessarily a portion of the orthogonal projection 311 of the inlet end 31 that is not within the overlapping area and a portion of the orthogonal projection 321 of the outlet end 32 that is not within the overlapping area. In some other cases, one of the orthogonal projections presents an area smaller than the area of the other orthogonal projection. Thus, it is possible that the orthogonal projection with the smaller area falls within the orthogonal projection with the larger area. In these cases, the technical effect of the invention is still obtained since there are still portions of gas flowing upwards that are redirected from a wetted zone of the first packed bed to a wetted zone of the second packed bed of the liquid-gas contacting column, notably those coming from or redirected to portion of the gas redirecting tube corresponding to non-overlapping area of the orthogonal projection with the larger area.

The overlapping area is preferably at most 40%, 30%, 20%, 10%, 5%, 0% of the total area of the upper plane covered by the orthogonal projections.

The outlet end 32 of each of the plurality of gas-redirecting tubes 3 may be adapted to let the gas flow in a direction substantially orthogonal to the upper plane once it exits the gas-redirecting tubes 3. In other words, the gas exiting the gas-redirecting tubes 3 is not mixed. In another embodiment, the outlet end 32 of each of the plurality of gas-redirecting tubes 3 may be adapted to let the gas flow in a direction substantially parallel to the upper plane once it exits the gas-redirecting tubes 3. In other words, the gas exiting the gas-redirecting tubes 3 is not mixed.

The outlet end 32 may be covered by a cover to avoid the introduction of the liquid falling downwards into the gas-redirecting tube 3. The cover may be chosen among the one known by the skilled person. For example, the cover may be flat, inverted V-shape (with the apex of the V away from the outlet end), etc.

The gas-redirecting tube 3 may be straight or comprise at least one curved portion. Thus, when the gas-redirecting tube 3 is straight, since the orthogonal projection 311 of the inlet end 31 onto the upper plane and the orthogonal projection 321 of the outlet end 32 onto the upper plane do not overlap, the gas-redirecting tube 3 is inclined at an angle different from 90° relatively to the upper plane. If the gas-redirecting tube 3 comprises at least one curved portion, it may comprise two or more straight portions and one or more curved portions, each connecting two straight portions to each other. In this latter case, it may alternatively consist of only one curved portion with or without any point of inflection.

The plurality of gas-redirecting tubes 3 may comprise m gas-redirecting tubes 3, with m an integer. The value of m depends on the size of the gas-redirecting device 100, in particular on the size of the plate 2. The value of m may be at least 2, in particular 2 to 50, more particularly 2 to 30, more particularly 2, 3, 4, 5, 6, 7, 8, 9, 10, 11, 12, 13, 14, 15, 16, 17, 18, 19, 20, 21, 22, 23, 24, 25, 26, 27, 28, 29, 30.

The number of gas-redirecting tubes 3 may be adapted to the number of packed beds contained in the liquid-gas contacting column in which the gas redirecting device is to be mounted. For example, in a liquid-gas contacting column having p packed beds, p being an integer, m may equal p or may be a multiple of p.

The number of gas-redirecting tubes 3 may be first determined according to the maximum acceptable pressure loss through the column and then rounded off to the closest greater integer that it is equal to or a multiple of the number of packed beds.

The m gas-redirecting tubes 3 are generally homogeneously distributed throughout the plate 2. For example, the density of the plurality of gas-redirecting tubes 3 may be at least 0.04 tube/m$^2$, in particular 0.04 tube/m$^2$ to 3 tubes/m$^2$. In particular, they may be distributed so as to present an n-fold rotational symmetry, with n an integer, in particular n is equal to m or m/2, i.e. n may be at least 2, in particular 2 to 50, more particularly 2 to 30, even more particularly 2, 3, 4, 5, 6, 7, 8, 9, 10, 11, 12, 13, 14, 15, 16, 17, 18, 19, 20, 21, 22, 23, 24, 25, 26, 27, 28, 29, 30.

Each gas-redirecting tube 3 of the gas-redirecting device 100 may be fixed to the plate, they are preferably welded, gasketed, bolted, screwed, clamped or press fitted to the plate 2 so that the fixation of each gas-redirecting tube 3 to the plate is gas-tight. Advantageously, these processes are well known by the skilled person.

The gas-redirecting tubes 3 may be all of the same length or of different lengths, for example 2 to 5 different lengths. Having gas-redirecting tubes of different lengths, notably 2 to 5 different lengths, makes it possible to distribute the gas more evenly through column of great diameter, for example over 2 m.

The gas-redirecting tubes 3 may be all of the same diameter or of different diameters, for example 2 to 5 different diameters. The pressure loss through a column of great diameter, for example over 2 m, can be minimized by choosing the number m of gas-redirecting tubes 3 having different diameters, notably 2 to 5 different diameters.

Column

In a liquid-gas contacting column 200 comprising at least two packed beds, the gas-redirecting device 100 of the present invention is positioned between two subsequent packed beds 210, 220. In particular, it is positioned within the inner space of said liquid-gas contacting column between two packed beds.

As illustrated in the FIG. 10, a gas-redirecting device 100 of the present invention is positioned, within the inner space of the liquid-gas contacting column 200, between a first packed bed 210 and a second packed bed 220.

Thanks to the gas-redirecting device 100 of the present invention, in operation, portions of gas 9 flowing upwards can be redirected from a wetted zone 211, 212, 213 of the first packed bed 210 to a wetted zone 221, 222, 223 of the second packed bed 220 of the liquid-gas contacting column 200, the wetted zone 211, 212, 213 of the first packed bed 210 and the wetted zone 221, 222, 223 of the second packed bed 220 being offset from one another with respect to a vertical line.

In particular, the liquid load through the wetted zone 211, 212, 213 of the first packed bed 210 may be different or likely to be different from the liquid load through the wetted zone 221, 222, 223 of the second packed bed 220.

Within the scope of the present disclosure, the word "different" is to be understood as meaning that the liquid load through a wetted zone 211, 212, 213 of the first packed bed 210 is at least 5% higher or lower than the liquid load through a wetted zone 221, 222, 223 of the second packed bed 220, preferably at least 10%, preferably at least 20%.

Further, the skilled person would understand that within a liquid-gas contacting column, when considering one given zone of the first packed bed, some zones of the second packed bed have a higher stochastic probability to be different from the given zone of the first packed bed. The phrase "likely to be different" is intended to convey this reality.

The wetted zones 211, 212, 213, 221, 222, 223 may be sorted into a plurality of types of wetted zone according to the liquid load flowing therethrough, such as underloaded area 211, 221, normally loaded area 212, 222 and overloaded area 213, 223. Even if only these three areas are described, the skilled person will understand that other areas may be present between said three areas.

A normally loaded area 212, 222 is a zone, in particular a central zone, of the packed bed 210, 220 wherein the liquid load is −20% to +20%, preferably −10% to +10%, more preferably −5% to +5% of the average liquid load in a non-oscillating liquid-gas contacting column 200. A normally loaded area is not substantially impacted by liquid maldistribution. In other words, the gas treatment is not substantially altered in a normally loaded area 212, 222.

An underloaded area 211, 221 is a zone, in particular a peripheral zone, of the packed bed 210, 220 wherein the liquid load is at most −20%, in particular is of −100% to −20% of the average liquid load in a non-oscillating liquid-gas contacting column 200. In these underloaded areas 211, 221, formation of preferential pathways may occur, so that the gas 9 can pass through the underloaded area 211, 221 without being treated: the gas treatment is substantially impaired in the underloaded area 211, 221. Such an underloaded area 211, 221 usually appears at the side of the packed bed away from the movement direction of the liquid-gas contacting column 200.

An overloaded area 213, 223 is a zone, in particular a peripheral zone, of the packed bed 210, 220 wherein the liquid load is at least +20%, in particular is of +20% to +100% of the average liquid load in a non-oscillating liquid-gas contacting column 200. In such overloaded area 213, 223, the gas 9 is over-rinsed. Such an overloaded area 213, 223 usually appears at the side of the packed bed closer to the movement direction of the liquid-gas contacting column 200.

The m gas-redirecting tubes 3 may be distributed and oriented so that the gas-redirecting device 100 is likely to redirect:
  portions of the gas 9 flowing upwards from an underloaded area 211 of the first packed bed 210 to an overloaded area 223 or a normally loaded area 222 of the second packed bed 220,
  portions of the gas 9 flowing upwards from an overloaded area 213 of the first packed bed 210 to an underloaded area 221 or a normally loaded area 222 of the second packed bed 220, and
  portions of the gas 9 flowing upwards from a normally loaded area 212 of the first packed bed 210 to an underloaded area 221 or an overloaded area 223 of the second packed bed 220.

The m gas-redirecting tube 3 may also be distributed so that gas-redirecting device 100 is likely to redirect:
  portions of the gas 9 flowing upwards from the underloaded area 211 and from the overloaded area 213 of the first packed bed 210 to the normally loaded area 222 of the second packed bed 220, and
  portions of the gas 9 flowing upwards from the normally loaded area 212 of the first packed bed 210 to the underloaded area 221 and to the overloaded area 223 of the second packed bed 220.

As explained above, the m gas-redirecting tubes 3 are generally homogeneously distributed throughout the plate 2. In particular, they may be distributed so that the gas-redirecting device presents an n-fold rotational symmetry, with n an integer, preferably n is equal to m or m/2, i.e. n may be at least 2, in particular 2 to 50, more particularly 2 to 30, even more particularly 2, 3, 4, 5, 6, 7, 8, 9, 10, 11, 12, 13, 14, 15, 16, 17, 18, 19, 20, 21, 22, 23, 24, 25, 26, 27, 28, 29, 30.

Since the oscillating movement of a liquid-gas contacting column 200 is incessant and unpredictable on a floating support, the type of one wetted zone is thus incessantly and unpredictably changing. Advantageously, no matter the location of the wetted zones 211, 212, 213, 221, 222, 223 in the first packed bed 210 and in the second packed bed 220, the n-fold rotational symmetry of the gas-redirecting device 100 increases the probability that the gas 9 flowing upwards is redirected from a wetted zone 211, 212, 213 of the first packed bed 210 to a wetted zone 221, 222, 223 of the second packed bed 220, the liquid load through the wetted zone 211, 212, 213 of the first packed bed 210 being different from the liquid load through the wetted zone 221, 222, 223 of the second packed bed 220.

In a liquid-gas contacting column 200 having p packed beds 210, 220, the m gas-redirected tube 3 may be distributed so that the gas-redirecting device 100 redirects the portions of gas 9 flowing upwards so as to realize a circular permutation of the portions of gas 9 by a $2\pi/m$ angle. After passing through the p packed beds 210, 220, all the portions of gas 9 would have contacted all types of wetted zone thereby improving the homogeneity and the efficiency of the gas treatment by said liquid-gas contacting column 200.

For example, if p=3 and m=3:
  ⅓ of the gas-redirecting tubes 3 redirect portions of the gas 9 flowing upwards from a normally loaded area 212 of the first packed bed 210 to an overloaded area 222 of the second packed bed 220,
  ⅓ of the gas-redirecting tubes 3 redirect portions of the gas 9 flowing upwards from an overloaded area 213 of the first packed bed 210 to an underloaded area 221 of the second packed bed 220, and
  ⅓ of the gas-redirecting tubes 3 redirect portions of the gas 9 flowing upwards from an underloaded area 211 of the first packed bed 210 to a normally loaded area 222 of the second packed bed 220,
  these redirection steps being repeated twice.

In another example, p=6 and m=3, then:
  ⅓ of the gas-redirecting tubes 3 redirect portions of the gas 9 flowing upwards from a normally loaded area 212 of the first packed bed 210 to an overloaded area 222 of the second packed bed 220,
  ⅓ of the gas-redirecting tubes 3 redirect portions of the gas 9 flowing upwards from an overloaded area 213 of the first packed bed 210 to an underloaded area 221 of the second packed bed 220 and
  ⅓ of the gas-redirecting tubes 3 redirect portions of the gas 9 flowing upwards from an underloaded area 211 of the first packed bed 210 to a normally loaded area 222 of the second packed bed 220,
  these redirection steps being repeated five times.

Since the portions of gas 9 flowing upwards are never mixed or homogenized between two packed beds 210, 220, if the gas residence time is at least 10 times lower than the characteristic time of the oscillating movement of the liquid-gas contacting column 200, then each of the different portions of gas 9 passes through all the types of differentiated wetted zones of the packed beds 210, 220 so that all the portions of gas 9 are homogeneously treated through the liquid-gas contacting column 200. The gas residence time is the time taken by the gas flowing upwards to flow from the gas inlet 202 to the gas outlet 203 of the liquid-gas contacting column 200. The characteristic time of the oscillating movement is the period of the oscillating movement. Therefore, thanks to the gas-redirecting device 100, the homogeneity of the gas treatment and the efficiency of the liquid-gas contacting column 200 of the present invention are improved.

The plate 2 may have a shape and dimensions adequate to enable the gas-redirecting device 100 to be fixed to the inner surface of the closed side wall 201 of the liquid-gas contacting column 200, for example by welding, gasketing, bolting, screwing, clamping or fit-pressing so that the fixation is gas-tight. In particular, the lateral wall 24 of the plate 2 may be fixed to the inner surface of closed side wall 201 of the liquid-gas contacting column 200.

In particular, the gas-redirecting device 100 may be fixed so that the upper plane of the plate 2 is orthogonal to the longitudinal axis of the liquid-gas contacting column 200.

In the liquid-gas contacting column 200, if the gas-redirecting device 100 is fluidly connected to a liquid distributor, it may recover the liquid stream falling downwards from the second packed bed 220 to redistribute uniformly said liquid stream into the first packed bed 210 thus limiting the liquid maldistribution in the liquid-gas contacting column. In this case, the homogeneity and the efficiency of the gas treatment by the liquid-gas contacting column 200 are further advantageously improved.

Method

Another aspect of the invention is a method for improving the efficiency of a liquid-gas contacting column having at least a first packed bed and a second packed bed positioned higher than the first packed bed each having differentiated wetted zones. The method comprises redirecting the gas from a wetted zone of the first packed bed to a wetted zone of the second packed bed, the wetted zone of the first packed bed and the wetted zone of the second packed bed being offset from one another with respect to a vertical line.

In particular, the liquid load through the wetted zone of the first packed bed may be different or likely to be different from the liquid load through the wetted zone of the second packed bed.

The gas is first introduced into the liquid-gas contacting column through the gas inlet, while the liquid is introduced through the liquid inlet.

If the column comprises more than two packed beds, the gas from a wetted zone of a lower packed bed is redirected to a wetted zone of a higher packed bed, the liquid load through the wetted zone of the lower packed bed being different from the liquid load through the wetted zone of the higher packed bed. This sequence is repeated from the gas inlet until the gas is recovered through the gas outlet. Further, unlike the methods of the prior art, between two packed beds, the gas is neither aimed to be mixed nor homogenized; it is simply redirected and continues to flow upwards so that its flowing direction from the outlet ends of the gas-redirecting tubes is substantially the vertical.

As previously explained, according to the method of the present invention, the homogeneity and the efficiency of the gas treatment through the liquid-gas contacting column are improved.

In a packed bed, the wetted zones may be sorted into a plurality of types of wetted zones according to the liquid load flowing therethrough, such as underloaded areas, normally loaded areas and overloaded areas. Even if only three types of wetted zones are herein described, the skilled person will understand that the wetted zones may be sorted into more than three types of wetted zones.

A portion of gas may be more likely redirected:
from an underloaded area of the first (or lower) packed bed to an overloaded area or a normally loaded area of the second (or higher) packed bed;
from an overloaded area of the first (or lower) packed bed to an underloaded area or anormally loaded area of the second (or higher) packed bed; and
from a normally loaded area of the first (or lower) packed bed to an underloaded area or an overloaded area of the second (or higher) packed bed.

For example, a portion of gas is more likely redirected:
from an underloaded area and an overloaded area of the first (or lower) packed bed to a normally loaded area of the second (higher) packed bed; and
from a normally loaded area of the first (or lower) packed bed to an underloaded area and an overloaded area of the second (higher) packed bed.

The gas may be redirected so that it passes through at least two types of wetted zone, preferably through three types of wetted zone of the column, more preferably through each type of wetted zones.

For example, if the method is to be used with a liquid-gas contacting column having p packed beds, a portion of gas may be redirected such that a circular permutation by a $2\pi/p$ angle is obtained. Thus, at the gas outlet all portions of gas have contacted all types of wetted zone thereby improving the homogeneity and the efficiency of the gas treatment.

The gas residence time is preferably set to be at least 2, preferably 5, more preferably 10 times lower than the characteristic time of the oscillating movement of the liquid-gas contacting column. Therefore, the homogeneity and efficiency of the gas treatment are improved.

The following examples provide another non-limiting illustration of the invention.

EXAMPLES

Example 1

Gas-Redirecting Device with m=8

As illustrated by FIGS. 1 to 4, the gas-redirecting device 100 comprises eight straight gas-redirecting tubes 3, a circular plane plate 2 having eight circular through-holes 21 and a circular central orifice 25. Four of the through-holes 21 are homogenously disposed on a first circle $C_1$ which is coaxial with the circular central orifice 25. The four other through-holes are homogeneously disposed on a second circle $C_2$ which is coaxial with the circular central orifice and which presents a radius greater than the radius of the first circle $C_1$. The through-holes 21 on the first circle $C_1$ angularly alternate with the through-holes on the second circle $C_2$. Each though-hole 21 is fluidly connected to one gas-redirecting tube 3 by the inlet end 31 thereof.

The gas-redirecting tubes 3 are inclined so that:
the outlet end 31 and the inlet end 32 of each tube are radially aligned;
the orthogonal projection 321 on the upper plane of the circular plane plate 2 (which is the upper surface of the circular plane plate) of the outlet ends 32 of each of the four gas-redirecting tubes 3 with inlet ends on the first circle $C_1$ are disposed on the second circle $C_2$; and the orthogonal projection 321 on the upper plane of the circular plane plate 2 (which is the upper surface of the circular plane plate) of the outlet ends 32 of each of the four gas-redirecting tubes with inlet ends on the second circle $C_2$ are disposed on the first circle $C_1$. Thus, the gas-redirecting device 100 presents a 4-fold rotational symmetry.

Example 2

Gas-Redirecting Device, wherein m=3

Figure 7:
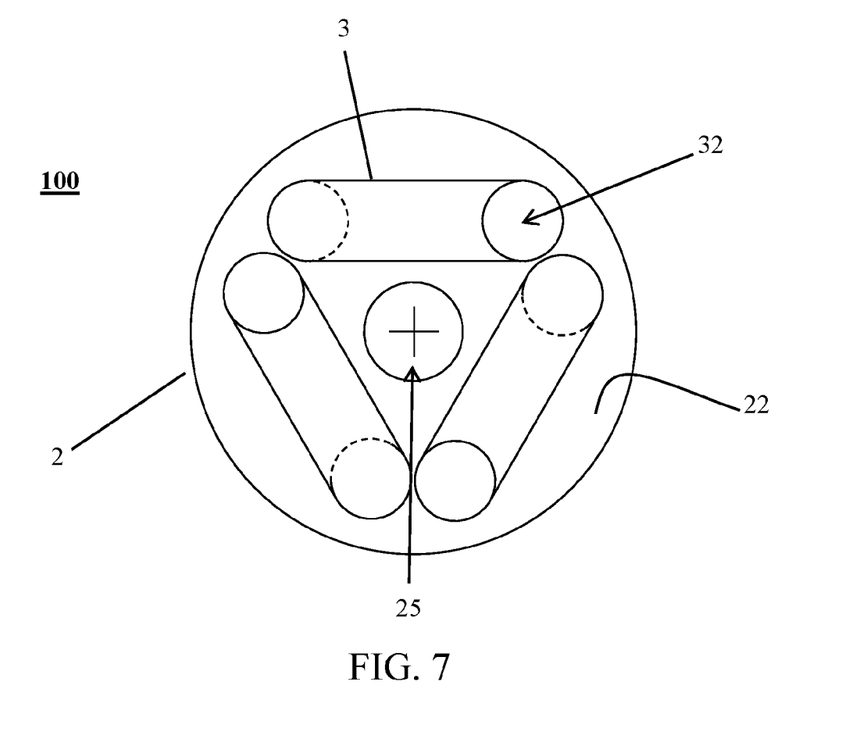
FIG. 7 is a top view schematically illustrating a gas-redirecting device according to the present invention having three gas-redirecting tubes.

As illustrated by FIGS. 7 to 9, the gas-redirecting device 100 comprises three straight gas-redirecting tubes 3, a circular plane plate 2 having three circular through-holes 21 and a circular central orifice 25. Each though-hole 21 is fluidly connected to one gas-redirecting tube 3 by the inlet end 31 of the one gas-redirecting tube 3.

The gas-redirecting tubes 3 are inclined so that:
the orthogonal projection 321 on the upper plane of the circular plane plate 2 (which is the upper surface of the circular plane plate) of all outlet ends 32 and all inlet ends 31 of the gas-redirecting tubes are disposed on a same circle $C_3$ coaxial to the circular central orifice 25;
the orthogonal projection 321 of the outlet ends 32 alternate with the inlet ends 31.

Thus, the gas-redirecting device 100 presents a 3-fold rotational symmetry and the three gas-redirecting tubes 3 of the gas-redirecting device 100 can redirect the gas flowing upwards so as to realize a circular permutation of the portions of the gas by a $2\pi/3$ angle.\

Various modifications to the invention may be apparent to one of skill in the art upon reading this disclosure. For example, persons of ordinary skill in the relevant art will recognize that the various features described for the different embodiments of the invention can be suitably combined, un-combined, and re-combined with other features, alone, or in different combinations, within the spirit of the invention. Likewise, the various features described above should all be regarded as example embodiments, rather than limitations to the scope or spirit of the invention. Therefore, the above is not contemplated to limit the scope of the present invention.

The invention claimed is:

1. A gas-redirecting device for a liquid-gas contacting column, the gas-redirecting device comprising:
   a plate presenting an upper plane and having a plurality of through-holes allowing a gas to pass through the plate;
   a plurality of gas-redirecting tubes, each gas-redirecting tube comprising an inlet end and an outlet end and being fluidly connected to a through-hole of the plate and;
   wherein for each gas-redirecting tube, the orthogonal projections of the inlet end and outlet end onto the upper plane have an overlapping area of at most 50% of the total area covered by the orthogonal projections of the inlet end and outlet end,
   wherein a first part of the plurality of gas-redirecting tubes is inclined towards the center of the plate and a second part of the plurality of gas-redirecting tubes is inclined toward the periphery of the plate, or
   wherein the gas-redirecting tubes of the plurality of gas-redirecting tubes are inclined so that:
      the orthogonal projection of all outlet ends and all inlet ends of the gas-redirecting tubes on the upper plane are disposed on a same circle, and
   the orthogonal projection of the outlet ends alternate with the inlet ends.

2. The gas-redirecting device of claim 1, wherein each gas-redirecting tube is welded, gasketed, bolted, screwed, clamped or press fitted to the plate.

3. The gas-redirecting device of claim 1, further comprising at least one orifice allowing a liquid to pass through the plate.

4. The gas-redirecting device of claim 1, further comprising at least one liquid-collecting tube comprising an inlet end and an outlet end and being fluidly connected to the orifice by its inlet end.

5. A liquid-gas contacting column comprising:
   at least two packed beds; and
      a gas-redirecting device of claim 1 disposed between the two packed beds.

6. The liquid-gas contacting column of claim 5 further comprising a closed side wall presenting an inner surface, wherein the plate is fixed to the inner surface.

7. The liquid-gas contacting column of claim 6 wherein the liquid-gas contacting column has a longitudinal axis and the upper plane of the plate is orthogonal to said longitudinal axis.

8. A floating support comprising the liquid-gas contacting column of claim 5.

9. The liquid-gas contacting column of claim 6 wherein the plate is fixed to the inner surface by welding, gasketing, bolting, screwing, clamping or fit-pressing so that the fixation is gas-tight.

10. A method for improving the efficiency of a liquid-gas contacting column having at least a first packed bed, a second packed bed positioned higher than the first packed bed, and a gas-redirecting device of claim 1 disposed between the first packed bed and the second packed bed, each bed having a wetted zone differentiated by the liquid load therethrough,
   comprising the following step:
      redirecting a gas from the wetted zone of the first packed bed to the wetted zone of the second packed bed with the gas-redirecting device,
   wherein the wetted zone of the first packed bed and the wetted zone of the second packed bed are offset from one another with respect to a vertical line.

* * * * *